ALEXANDER WHITE.
Improvement in Base-Burning Stoves.
No. 4,426. Reissued June 13, 1871.
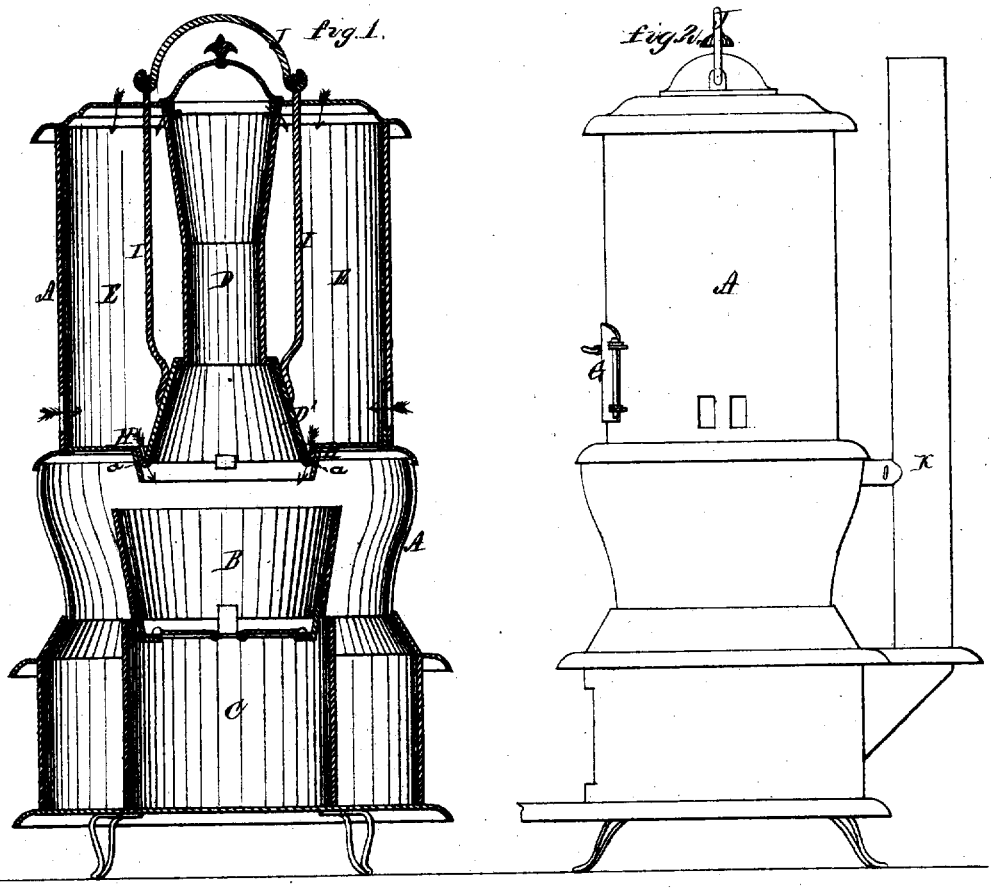
Witnesses
John A. Ellis
G. V. White
Inventor
A. White
per
J. H. Alexander
Atty
AM. PHOTO-LITHOGRAPHIC CO. N.Y. (OSBORNE'S PROCESS.)

UNITED STATES PATENT OFFICE.

ALEXANDER WHITE, OF ROCK ISLAND, ILLINOIS, ASSIGNOR TO THE ROCK ISLAND STOVE COMPANY, OF SAME PLACE.

IMPROVEMENT IN BASE-BURNING STOVES.

Specification forming part of Letters Patent No. 101,688, dated April 5, 1870; reissue No. 4,426, dated June 13, 1871.

*To all whom it may concern:*

Be it known that I, ALEXANDER WHITE, of Rock Island, in the county of Rock Island and State of Illinois, have invented certain new and useful Improvements in Stoves; and I do hereby declare that the following is a full, clear, and exact description thereof, reference being had to the accompanying drawing and to the letters of reference marked thereon which form a part of this specification.

The nature of my invention consists, first, in constructing the magazine of a base-burning stove in sections, the lower section being movable; and, second, in providing a base-burning stove, at or near the lower end of the magazine, with a ring or plate so arranged around the magazine as to prevent the heat from coming up around the magazine, and at the same time form an opening for admitting air over the top of the fire, so as to form a draft that will carry the fire and heat away from the said magazine.

In order to enable others skilled in the art to which my invention appertains to make and use the same, I will now proceed to describe its construction and operation, referring to the annexed drawing, in which—

Figure 1 is a longitudinal vertical section, and Fig. 2 a side elevation, of my stove.

A represents the outer shell of a base-burning stove; B, the fire-pot or chamber; and C, the ash-box. D represents the magazine, and E the chamber around the same, between it and the outer shell A. The magazine D is made in two sections, the base or lower section D being movable—that is, it can be raised up from its position when fuel is to be placed in the fire-pot B through the door G. The lower section D′ is conical-shaped, and provided with two rods, I I, which pass upward through the top of the stove, and are connected by the bail J. The rods I I are notched or otherwise arranged, so that when raised up they can be fastened to hold the base D′ up. Around the lower end of the magazine, from the outer shell, is a ring or plate, H, which may extend inward or downward, only so as to encircle the lower end of the magazine, stopping a short distance from the same, so as to form an air-passage between said ring or plate and the lower end of the magazine. On the ring or plate H are placed suitable hooks *a a*, on which the base or lower section D′ rests. This ring has a twofold office to perform in the operations of the stove—viz., to keep the heat from arising and heating the magazine, and at the same time to form a passage for air to pass into the fire between said ring and the magazine. This air-passage aids in preserving both the ring and the magazine, and to keep the temperature in the magazine at a low point, and also aids in consuming the gases as they pass from the magazine to the combustion-chamber. The air passing down between this plate and the magazine becomes heated, and the instant it passes into the fire it unites with the coal gases and ignites and gives a bright gas-flame all around the base of the magazine. When the air is not admitted the bright gas-flame ceases and a cloud of black smoke passes off, as in a common stove. In place of supporting the magazine by the hooks *a a*, there may be lugs or projections on the magazine that will rest either on the top of the ring or in recesses provided in the ring for that purpose; but I prefer to use the hooks as above described, as that allows the magazine to turn in a circular direction. The ring or plate H may be made in one piece, or in as many sections as may be desired, only so as to form, when put together, a plate extending from the outer shell inward toward the magazine, and downward to or near the lower end of the magazine, leaving a space between the same and the magazine. This arrangement leaves no opening or passage between the combustion-chamber and the upper part around the magazine, except the one between it and the ring; consequently there is no heat encircling the feeder except what passes through the iron, a portion of which is carried back by the draft from above. It is immaterial where the air is admitted into the space that surrounds the upper part of the feeder. It may be where shown in the drawing by arrows in Fig. 1, or at the top, or at any intermediate point, or in any manner desired, so as to let it into the chamber above the ring H.

Having thus fully described my invention, what I claim as new, and desire to secure by Letters Patent, is—

1. The magazine of a base-burning stove constructed with telescopic sections, when the lower section is raised or lowered by means of depending rods, substantially as shown.

2. The movable base or lower section D′, constructed with an expanded mouth substantially as described.

3. In combination with the movable base D, rods I I and bail J, all arranged to operate substantially as described.

4. A ring or plate, H, encircling the lower end of the magazine in a base-burning stove, substantially as and for the purposes herein set forth.

5. In combination with a ring or plate encircling the lower end of the magazine in a base-burning stove, hooks attached to said ring, or lugs on the magazine for supporting the magazine, substantially as herein set forth.

6. In combination with a ring or plate encircling the lower end of the magazine in a base-burning stove, as herein described, openings in the outer shell of the stove, so as to admit air into the chamber above said ring or plate, for the purposes herein set forth.

In testimony that I claim the foregoing as my own patent, I affix my signature in presence of two witnesses.

ALEXANDER WHITE.

Witnesses:
CARL H. GLEIM,
PHIL. MITCHELL.